(No Model.)
R. R. PARRISH.
HOP TWINING MECHANISM.
No. 566,092. Patented Aug. 18, 1896.
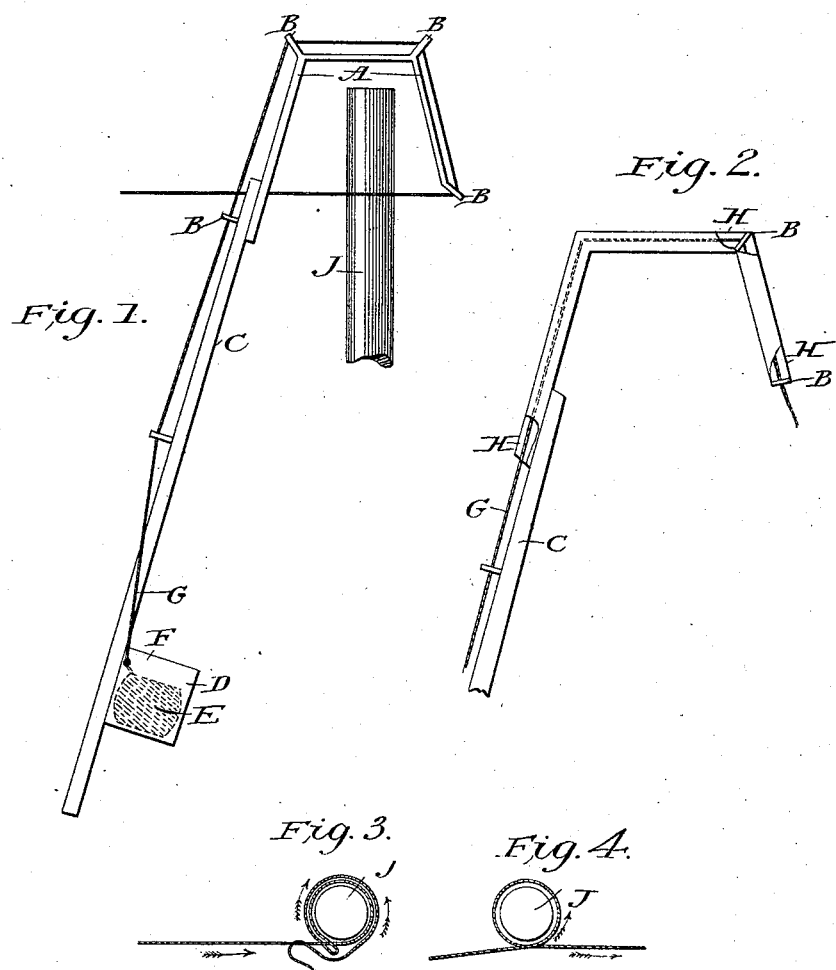

UNITED STATES PATENT OFFICE.

ROB ROY PARRISH, OF INDEPENDENCE, OREGON.

HOP-TWINING MECHANISM.

SPECIFICATION forming part of Letters Patent No. 566,092, dated August 18, 1896.

Application filed November 27, 1894. Serial No. 530,111. (No model.)

*To all whom it may concern:*

Be it known that I, ROB ROY PARRISH, a citizen of the United States, residing at Independence, in the county of Polk and State of Oregon, have invented a new and useful Twine-Set, of which the following is a specification.

My invention relates to placing twine upon hop stakes or poles.

The object of my invention is to facilitate the operation.

My invention consists of an angular hook provided with guide-eyes arranged in such a manner that twine may be tightly conducted around and over the top of hop stakes or poles without the twine's dragging upon the body of the hook, and in the accompanying drawings, forming part of this specification, and in which like letters of reference indicate corresponding parts, I have illustrated several forms of my invention.

In the drawings, Figure 1 represents a hook ready for operation; Fig. 2, a modified form; Figs. 3 and 4, top views of stake and twine.

I will first describe my invention as illustrated in Fig. 1, in which A represents a metallic hook having the projecting guide-eyes B, B, and B. The wood handle C is secured to the hook by bolts, screws, or otherwise, and is provided with two projecting guide-eyes B and B, while near the bottom of the handle is placed a twine-carrier D, within which is carried a ball of twine, (indicated by the dotted line E.) In the side of the carrier D is an opening F, through which the twine G is drawn out and passed up through the various guide-eyes B, B, B, B, and B without dragging on the body of the hook. The guide-eyes may be furnished with pulley-wheels, so as to make heavy hemp or tarred twine run off more easily. The guide-eyes may be placed at the side of or within the hook and yet conduct the twine free from the body of the hook.

The hook represented in Fig. 2 has side flanges H and H, within which are placed the guide-eyes B and B, so as to cause the twine G to pass freely within the flanges, as indicated by the dotted line B.

To operate the hook, first fasten the free end of the twine to some suitable anchorage, as a fence or stake, then catch the handle C just above the carrier D with the right hand, grasping the handle near the lower guide-eye B with the left, advance toward the stake J, (keeping the twine tight,) pass the point of the hook past the right side of the stake, then swing the point across the front of the stake, after which bring it back (toward the anchorage) by the left side of the stake, then across its rear side and over the stretched twine. (See Fig. 3.) This will wrap the twine once around the stake and may be repeated as often as desired. If preferred, when once around, the hook may be ducked and passed beneath the stretched twine, then raised and passed back around the stake in the opposite direction until around the second time, then again ducked and drawn to right side, as indicated in Fig. 4.

It is obvious that various modifications of these forms may be made, different styles of handles used, a reel device attached for carrying the twine, tension-brakes employed, the hook carried by a belt or other support, the twine-carrier placed elsewhere than here shown and be furnished with a lid or other means to prevent the twine from jumping out of the carrier, the guide-eyes formed open or closed, that by the aid of swaying or rotating mechanism a conveyance may be employed and more than one row of hop-stakes be twined during a trip across the hop-patch, that various parts of my invention be formed integrally or separately and then suitably united, and I do not intend to confine myself to the few forms here shown.

Having described my invention, what I claim as new, and desire to secure by Letters Patent, is—

The combination in a twine-set, of an angular hook, and projecting guide-eyes, said eyes being arranged on said hook and its handle in such a manner that tightly-stretched twine passing through said eyes will not drag on the body of said hook.

ROB ROY PARRISH.

Witnesses:
J. W. KIRKLAND,
D. F. HOPKINS.